(12) United States Patent
Kudo

(10) Patent No.: US 7,626,767 B2
(45) Date of Patent: Dec. 1, 2009

(54) ZOOM LENS

(75) Inventor: Yoshinobu Kudo, Toshima-ku (JP)

(73) Assignee: Asia Optical Co., Inc., Taichung (TW)

( * ) Notice: Subject to any disclaimer, the term of this patent is extended or adjusted under 35 U.S.C. 154(b) by 0 days.

(21) Appl. No.: 12/186,710

(22) Filed: Aug. 6, 2008

(65) Prior Publication Data
US 2009/0040621 A1 Feb. 12, 2009

(30) Foreign Application Priority Data
Aug. 10, 2007 (TW) .............................. 96129627 A

(51) Int. Cl.
*G02B 15/14* (2006.01)
*G02B 17/00* (2006.01)

(52) U.S. Cl. .................. 359/683; 359/684; 359/726

(58) Field of Classification Search .................. 359/683, 359/684, 726
See application file for complete search history.

(56) References Cited

U.S. PATENT DOCUMENTS

| 5,136,430 A * | 8/1992 | Hamanishi | 359/676 |
|---|---|---|---|
| 6,061,180 A * | 5/2000 | Hayakawa | 359/557 |
| 6,639,737 B2 * | 10/2003 | Yasui et al. | 359/761 |
| 7,079,324 B2 * | 7/2006 | Yamasaki | 359/680 |
| 7,593,168 B2 * | 9/2009 | Shirota | 359/684 |
| 2005/0099700 A1 | 5/2005 | Ohtake | |

FOREIGN PATENT DOCUMENTS

| JP | A8248318 | 9/1996 |
| JP | A2000131610 | 12/2000 |
| JP | A2003202500 | 7/2003 |

\* cited by examiner

*Primary Examiner*—Scott J Sugarman
(74) *Attorney, Agent, or Firm*—Thomas, Kayden, Horstemeyer & Risley

(57) ABSTRACT

A zoom lens for capturing images that enhances the image aberration correction rate to achieve high resolution and zooming ratio. The zoom lens includes, in sequence from an object side to an image side, a first lens group with positive refraction power, a second lens group with negative refraction power, a third lens group with positive refraction power, a fourth lens group with positive refraction power, a fifth lens group with positive refraction power and a sixth lens group with positive refraction power. The positions of first and sixth lens groups are fixed during photographing. When the zoom lens is made to zoom from a wide-angle end to a telephoto end thereof, the second lens group moves toward the image side while the fourth and fifth lens groups move toward the object side. In addition, the zoom lens has a reflection element so as to fold the image light entering thereof.

17 Claims, 7 Drawing Sheets

ZOOM LENS

BACKGROUND OF THE INVENTION

1. Field of the Invention

The present invention relates to a zoom lens, and particularly to a small-size and high-zooming ratio zoom lens having a reflective element therein.

2. Description of Prior Art

In recent years, most electronic devices, such as mobile phones, personal digital assistants (PDAs), notebook computers, have been integrated with a zoom lens. Differing from the digital zoom, the zoom lens can vary zoom ratio without deteriorating the image quality.

For example, U.S. Pub. No. 2005/0099700A1 disclosed a positive-negative-positive-positive 4-group zoom lens. When the zoom lens changes from a wide-angle end state to a telephoto end state, the first lens group and the third lens group are fixed in a predetermined position in an optical axis direction, and the second lens group moves towards the image side. The prior art disclosed an optical zooming structure, but it cannot achieve high zoom ratio.

Then, as a configuration of a zoom lens to provide compatibility between slimming down and strong durability, in a four-group configuration of first positive, second negative, third positive and fourth positive groups, a right-angle prism is placed in the first lens group for bending the optical path approximately 90.degree. at midpoint to form a refractive optical system, thereby shortening the length of the optical system in the thickness direction thereof (Refer to JP-A-8-248318, JP-A-2000-131610 and JP-A-2003-202500). In the configuration, the first lens group is fixed when zoomed and focused and thus a structure wherein the entire lens barrel can be housed in the imaging apparatus main body can be produced, making it possible to increase the durability as compared with the zoom lens made up of three groups described above.

However, the zoom lens described in JP-A-8-248318 is inappropriate for slimming down because the first lens group is large and the overall number of lenses is also large although the zoom lens has a large zoom ratio and a bright F value. The zoom lens described in JP-A-2000-131610 has a small number of lenses and a large angle of field at a wide angle end, but the first lens group is large and the right-angle prism has a low refractive index and is hard to totally reflect and thus reflecting coat becomes necessary on the reflection face of the right-angle prism, resulting in lowering of transmittance in the whole system and an increase in the cost. The zoom lens described in JP-A-2003-202500 involves various examples, which contain some examples of compact zoom lenses with a small number of lenses, but high-refractive index and high-dispersion material is used for the right-angle prism in every example and the transmittance on the short wavelength side of a visible light beam lowers. That is, in JP-A-2003-202500, a right-angle prism of a material with the refractive index at the d-line exceeding 1.8 and the Abbe number less than 30 is adopted as an example; under present circumstances, however, such a high-refractive index and high-dispersion material having sufficiently high transmittance does not exist and is not practical.

SUMMARY OF THE INVENTION

An object of the present invention is to provide a zoom lens with a reflective element to provide a high zoom ratio and high level of image performance. Thus, the camera installed the zoom lens also shortens the operating timing.

To achieve the above object, the present invention provides a zoom lens including, in order from an object side to an image side, a first lens group having positive refractive power, a second lens group having negative refractive power, a third lens group having positive refractive power, a fourth lens group having positive refractive power, a fifth lens group having positive refractive power and a sixth lens group having positive refractive power. The first and sixth lens groups are fixed when the zoom lens varies a power thereof. During zooming, the second lens group moves toward the first lens group along the optical axis, and the fourth and fifth lens groups move toward the sixth lens group.

The first lens group further includes an optical-path bending member for folding the optical axis at least approximately ninety degrees.

During zooming, the displacement of the second lens group moving along the optical axis is $\Delta X2$ and the displacement of the fifth lens group moving along the optical axis is $\Delta X5$, and then the zoom lens of the present invention satisfies the following condition (1):

$$0.7 \times \Delta X2 = \Delta X5 \qquad (1).$$

During zooming, the zoom lens of the present invention further satisfies the following condition (2):

$$2.17 < \frac{TTL}{f} < 8.7, \qquad (2)$$

where TTL represents a distance between the most object side lens surface of the zoom lens and an image plane and f represents a focal length of the zoom lens.

Each of the at least three lenses of the zoom lens has an aspheric surface, and the first lens of the first lens group has an aspheric surface.

In the zoom lens of the present invention, the first lens of the first lens group is a negative meniscus lens having an aspheric surface and has the functions of receiving light in wide angle and reducing the aberration.

In first lens group of the zoom lens of the present invention, the optical-path bending member for folding the optical axis is located between the first and second lenses.

In the present invention, the lens of the sixth lens group adjacent to the image side can be finely moved along the optical axis to compensate the focus of the zoom lens.

In the zoom lens of the present invention, the second lens group includes, in order from an object side to an image side, a fourth negative lens, a fifth negative lens and a sixth positive lens. The fifth negative lens and the sixth positive lens are cemented.

In the zoom lens of the present invention, the fourth lens group includes, in order from an object side to an image side, an eighth positive lens and a ninth negative lens, and the ninth negative lens is meniscus.

When the zoom lens changes from a wide-angle end state to a telephoto end state, the second, fourth and fifth lens groups move toward the third lens group.

The present zoom lens has a plurality of movable lens groups, but the displacement of each movable lens group is tiny. Thus, the present zoom lens provides the advantages of small size and low cost as compared to the conventional designs, while ensuring a high level of image performance.

BRIEF DESCRIPTION OF THE DRAWINGS

The present invention may be best understood through the following description with reference to the accompanying drawings, in which.

DETAILED DESCRIPTION OF THE PREFERRED EMBODIMENTS

The above-mentioned and other technical contents, features and effects of the present invention will become apparent from the hereinafter set forth detailed description of preferred numerical embodiments of the present invention in combination with the drawings.

Figure 1:
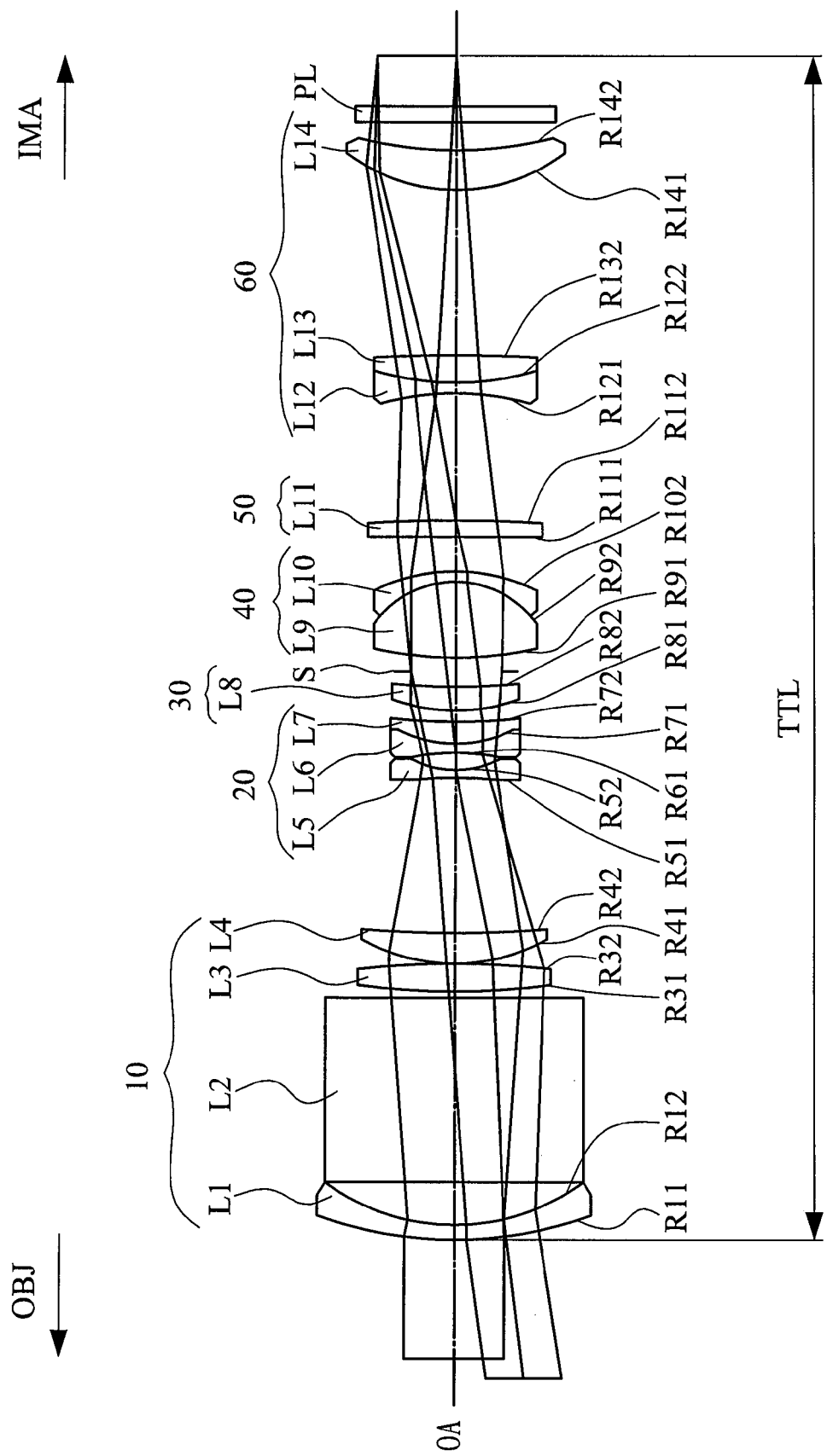
FIG. 1 is a schematic view illustrating lens positions of a zoom lens of the present invention at a telephoto end state.
Figure 3:
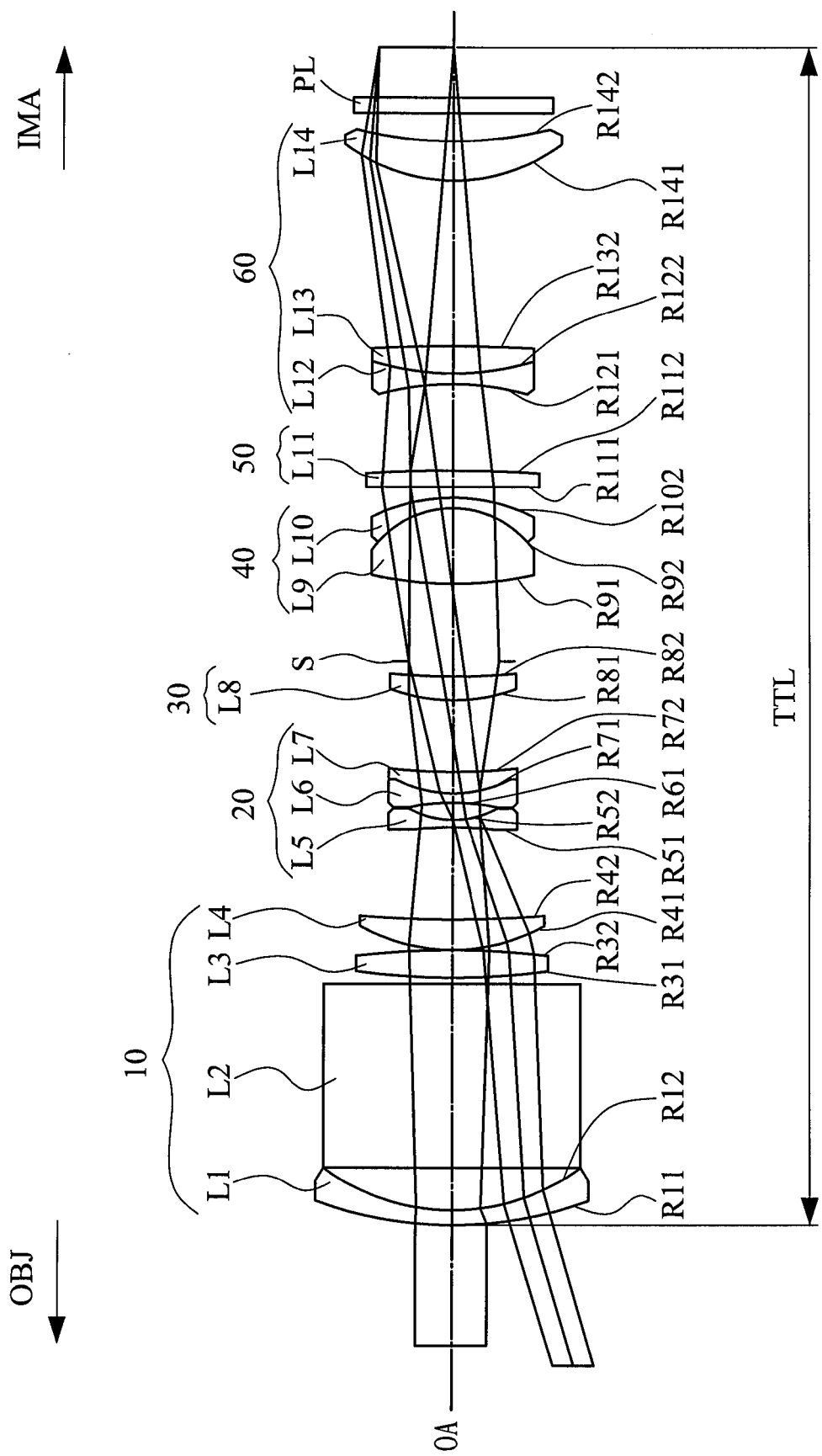
FIG. 3 is a schematic view illustrating lens positions of a zoom lens of the present invention at a intermediate position.
Figure 5:
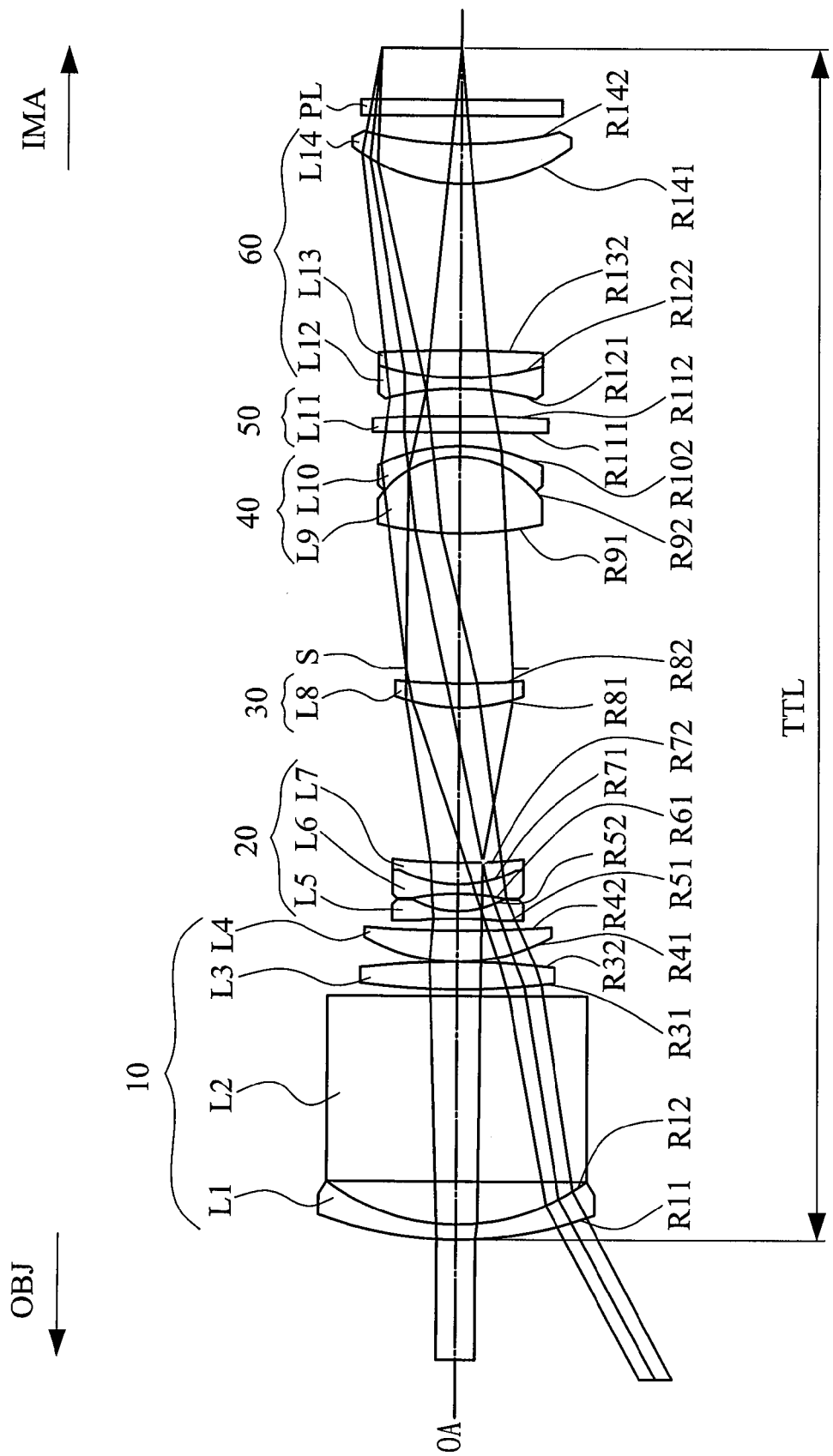
FIG. 5 is a schematic view illustrating lens positions of a zoom lens of the present invention at a wide-angle end state.

FIG. 1 is a schematic view illustrating lens positions of a zoom lens of the present invention at a telephoto end state, FIG. 3 is a schematic view illustrating lens positions of a zoom lens of the present invention at a intermediate position, and FIG. 5 is a schematic view illustrating lens positions of a zoom lens of the present invention at a wide-angle end state. The present invention provides a zoom lens, which is used in an image pickup device or a photographic device for forming an image of an object onto an image sensor or a film. The lens construction of the present zoom lens is illustrated in FIGS. 1, 3 and 5, in which symbol "OBJ" denotes the object side, symbol "IMA" denotes the image side, symbol "TTL" denotes a distance between the most object side lens surface of the zoom lens and an image plane, symbol "OA" denotes an optical axis of the zoom lens, and symbol "S" denotes an aperture stop. As shown in FIGS. 1, 3 and 5, the present zoom lens comprises, in order from the object side OBJ to the image side IMA, a first lens group 10 having positive refractive power, a second lens group 20 having negative refractive power, a third lens group 30 having positive refractive power, a fourth lens group 40 having positive refractive power, a fifth lens group 50 having positive refractive power and a sixth lens group having positive refractive power.

When the present zoom lens varies a power thereof, the positions of the first lens group 10, third lens group 30 and sixth lens group 60 are fixed, and the second lens group 20, fourth lens group 40 and fifth lens group 50 are moved along the optical axis OA. The first lens group 10 includes an optical-path bending member L2 for folding the optical axis at least approximately ninety degrees, such as a prism for folding the optical path for the first lens group 10.

When the present zoom lens varies a power thereof, the present zoom lens satisfies the following condition:

$$0.7 \times \Delta X2 = \Delta X5 \tag{1}$$

where $\Delta X2$ represents the displacement of the second lens group 20 moving along the optical axis OA and $\Delta X5$ represents the displacement of the fifth lens group 50 moving along the optical axis OA.

When the present zoom lens varies a power thereof, the present zoom lens satisfies the following condition:

$$2.17 < \frac{TTL}{f} < 8.7 \tag{2}$$

where TTL represents a distance along the optical axis OA from an object-side surface OBJ of the first lens L1 of first lens group 10 to an image forming surface and f represents the focal length of the present zoom lens.

The first lens group 10 with a focal length f1=3.987148 mm includes, in order from the object side OBJ to the image side IMA, a first negative lens L1, an optical-path bending member L2, a second positive lens L3 and a third positive lens L4. The first negative lens L1 is a negative meniscus lens whose convex surface R11 is oriented toward the object side, and has two aspheric surfaces. Thus, the first lens L1 has the functions of receiving light in wide angle and reducing the distortion aberration.

The second lens group 20 with a focal length f2=−1.2975 mm includes, in order from the object side OBJ to the image side IMA, a fourth negative lens L5, a fifth negative lens L6 and a sixth positive lens L7. The fifth negative lens L6 and the sixth positive lens L7 are combined to form a cemented lens.

The third lens group 30 with a focal length f3=3.5675 mm includes a seventh positive lens L8. The seventh positive lens L8 having two aspheric surfaces R81, R82 is a positive meniscus lens whose convex surface R81 is oriented toward the object side OBJ.

The fourth lens group 40 with a focal length f4=3.8279 mm includes, in order from the object side OBJ to the image side IMA, an eighth positive lens L9 and a ninth negative lens L10, and the eighth positive lens L9 and the ninth negative lens L10 are combined to form a cemented lens. The object side surface R91 of the eighth positive lens L9 which does not adhere to the ninth negative lens L10 is aspheric. In addition, the ninth negative lens L10 is a negative meniscus lens whose convex surface R102 is oriented toward the image side IMA.

The fifth lens group 50 with a focal length f5=20.18135 mm includes a tenth positive lens L11.

The sixth lens group 60 with a focal length f6=14.8341 mm includes, in order from the object side OBJ to the image side IMA, an eleventh negative lens L12, a twelfth positive lens L13 and a thirteenth positive lens L14. The eleventh negative lens L12 and the twelfth positive lens L13 are combined to form a cemented lens. The thirteenth positive lens L14 adjacent to the image side IMA can be finely moved along the optical axis OA to compensate the focus of the zoom lens.

The aperture stop S is located between the third lens group 30 and the fourth lens group 40.

Figure 7:
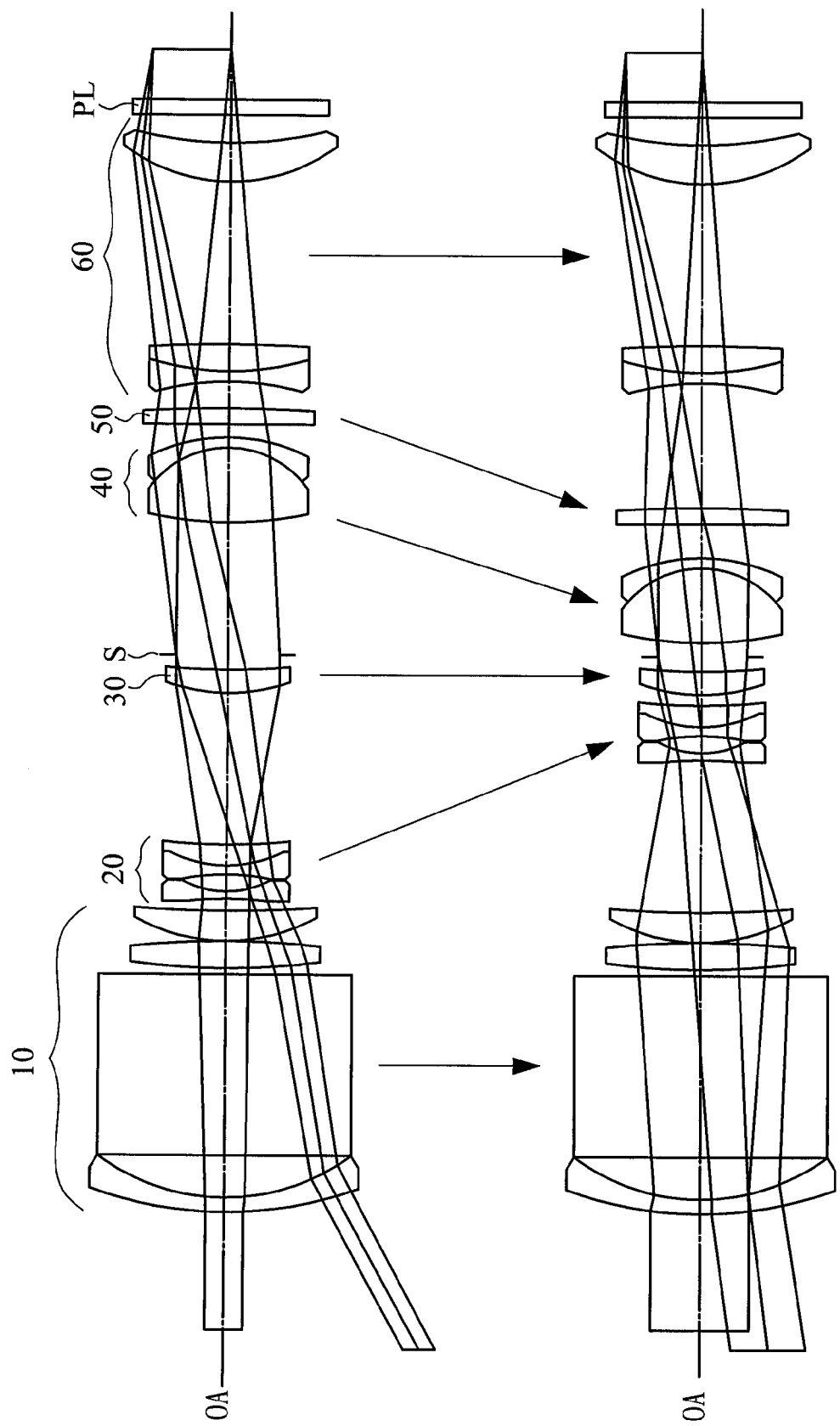
FIG. 7 is a sectional view showing a zoom lens according to the present invention together with the movement of each lens group upon zooming from a wide-angle end state to a telephoto end state.

Refer to FIG. 7, it shows that the zoom lens is at a wide-angle end state (Wide End) or at a telephoto end state (Tele End). The second lens group 20 is mainly involved with zooming and moves from the object side OBJ to the image side IMA along the optical axis OA at the time of zooming from a wide-angle end state to a telephoto end state. The fourth lens group 40 and the fifth lens group 50 are also mainly involved with zooming and move from the image side IMA to the object side OBJ along the optical axis OA at the time of zooming from a wide-angle end state to a telephoto end state. In other words, the second, fourth and fifth lens groups 20, 40, 50 move toward the third lens group 30 at the time of zooming from a wide-angle end state to a telephoto end state.

Numerical values of the component lenses of the present zoom lens according to the embodiment of the invention are shown in Data Table 1 given below. In Data Table 1 and other similar data tables provided hereinafter, "i" represents the order of the surface from the object side (including lens surfaces, the aperture stop S and the glass element PL), "Ri" represents the radius of curvature (mm) of the ith surface, "D" represents the ith member thickness or the distance (mm) between the ith surface and the (i+1)th surface, and "Nd" and "Vd" respectively represent the refractive index (d-line) and Abbe number (d-line) of the ith member.

DATA TABLE 1

| Surface (i) | Lens | Ri (mm) | D (mm) | Nd | Vd |
|---|---|---|---|---|---|
| 1 | L1 | 8.2622 | 0.15 | 1.84666 | 23.83 |
| 2 | | 3.0148 | 0.545 | | |
| 3 | L2 | ∞ | 2.3 | 1.883 | 40.77 |
| 4 | | ∞ | 0.05 | | |
| 5 | L3 | 8.66 | 0.325 | 1.58913 | 61.14 |
| 6 | | −8.227 | 0.025 | | |
| 7 | L4 | 2.58 | 0.3625 | 1.60311 | 60.64 |
| 8 | | 10.9555 | A | | |
| 9 | L5 | −24.125 | 0.1125 | 1.7495 | 35.28 |
| 10 | | 1.48725 | 0.2125 | | |
| 11 | L6 | −3.102 | 0.1125 | 1.6935 | 50.81 |
| 12 | L7 | 1.76325 | 0.275 | 1.92286 | 20.88 |
| 13 | | 8.5705 | B | | |
| 14 | L8 | 2.525 | 0.2875 | 1.8061 | 40.95 |
| 15 | | 19.5704 | 0.2 | | |
| 16 | S | ∞ | C | | |
| 17 | L9 | 4.5285 | 0.95 | 1.48749 | 70.21 |
| 18 | L10 | −1.26025 | 0.125 | 1.7552 | 27.51 |
| 19 | | −1.99675 | D | | |
| 20 | L11 | 19.822 | 0.195 | 1.48749 | 70.21 |

DATA TABLE 1-continued

| Surface (i) | Lens | Ri (mm) | D (mm) | Nd | Vd |
|---|---|---|---|---|---|
| 21 | | 19.602 | E | | |
| 22 | L12 | −4.3025 | 0.125 | 1.7552 | 27.51 |
| 23 | L13 | 4.0355 | 0.3425 | 1.43875 | 94.95 |
| 24 | | −28.9865 | F | | |
| 25 | L14 | 2.24375 | 0.5075 | 1.6393 | 44.87 |
| 26 | | 6.8625 | G | | |
| 27 | PL | ∞ | 0.2 | 1.51633 | 64.14 |
| 28 | | ∞ | 0.6425 | | |
| IMA | | ∞ | 0 | | |

According to the embodiment of the present zoom lens, with reference to FIGS. 1, 3 and 5, surfaces 1 and 2 of the first lens L1, surfaces 14 and 15 of the seventh lens L8 and surface 17 of the eighth lens L9 are all configured to be aspheric surfaces. Aspheric coefficients for these aspheric surfaces are given in following Data Table 2, wherein Conic represents a cone constant, and E4, E6, E8, E10, E12 and E14 are aspheric coefficients for fourth, sixth, eighth, tenth, twelfth and fourteenth order terms. During zooming operation, the first lens group 10, third lens group 30 and sixth lens group 60 may also be kept stationary. That is, the first lens group 10, third lens group 30 and sixth lens group 60 do not contribute to the zooming action.

DATA TABLE 2

| | Surface | | | | |
|---|---|---|---|---|---|
| | 1 | 2 | 14 | 15 | 17 |
| Conic | 19.3173 | 1.1293 | 0.6505 | 43.7583 | −1.985 |
| E4 | 8.810304E−3 | 6.797632E−3 | −2.6771904E−3 | 1.0758016E−2 | −1.5812672E−2 |
| E6 | −9.9815526E−4 | −2.006016E−4 | −6.3158784E−4 | 3.0704845E−3 | 2.8153139E−3 |
| E8 | −1.523789E−3 | −2.2965944E−3 | 7.2800993E−3 | 3.3796588E−3 | 5.295358E−3 |
| E10 | 5.18762E−5 | 2.6212539E−4 | −1.9097217E−2 | 3.2808632E−3 | −9.3548446E−3 |
| E12 | 2.0126326E−4 | 2.9033056E−5 | 8.7762456E−2 | 7.094833E−3 | 8.7517089E−3 |
| E14 | −4.2061957E−5 | 4.7887476E−5 | −5.5675124E−2 | 5.0608271E−2 | −2.0410691E−3 |

Data Table 3 provided below shows variable spacings A, B, C, D and E between the six lens groups at the respective wide-angle end state (W), the intermediate position (M) and the telephoto end state (T) according to the embodiment, wherein A denotes a first variable spacing along the optical axis between the image-side surface 8 of the third positive lens L4 of the first lens group 10 and the object-side surface 9 of the fourth negative lens of the second lens group 20, B denotes a second variable spacing along the optical axis between the image-side surface 13 of the sixth positive lens L7 of the second lens group 20 and the object-side surface 14 of the seventh positive lens L8 of the third lens group 30, C denotes a third variable spacing along the optical axis between the aperture stop S and the object-side surface 17 of the eighth positive lens L9 of the fourth lens group 40, D denotes a fourth variable spacing along the optical axis between the image-side surface 19 of the ninth negative lens L10 of the fourth lens group 40 and the object-side surface 20 of the tenth positive lens L11 of the fifth lens group 50, and E denotes a fifth variable spacing along the optical axis between the image-side surface 21 of the tenth positive lens of the fifth lens group 50 and the object-side surface 22 of the eleventh negative lens L12 of the sixth lens group 60. In addition, the focal lengths f of the present zoom lens at the respective wide-angle end state (W), the intermediate position (M) and the telephoto end state (T) are also provided in Data Table 3.

Data Table 3

| | W (f = 1.737 mm) | M (f = 3.37662 mm) | T (f = 6.55332 mm) |
|---|---|---|---|
| A | 0.1595 | 1.208 | 1.9365 |
| B | 1.90075 | 0.8525 | 0.12375 |
| C | 1.66675 | 0.955 | 0.17875 |
| D | 0.16325 | 0.141 | 0.40725 |
| E | 0.33525 | 1.069 | 1.57925 |

Data Table 4 provided below shows variable spacing F between the twelfth positive lens L13 and the thirteenth positive lens L14 six lens at the respective wide-angle end state (W), the intermediate position (M) and the telephoto end state (T) according to the embodiment. It also shows variable spacing G between the thirteenth positive lens L14 and the flat glass PL at the respective wide-angle end state (W), the intermediate position (M) and the telephoto end state (T) according to the embodiment. Thus, F denotes a sixth variable spacing along the optical axis between the image-side surface 24 of the twelfth positive lens L13 of the sixth lens group 60 and the object-side surface 25 of the thirteenth positive lens L14 of the sixth lens group 60, and G denotes a seventh variable spacing along the optical axis between the image-side surface 26 of the thirteenth positive lens L14 of the sixth lens group 60 and the object-side surface 27 of the flat glass PL. Therefore, the thirteenth positive lens L14 can be finely moved along the optical axis to compensate the focus of the zoom lens.

Data Table 4

| | W (f = 1.737 mm) | M (f = 3.37662 mm) | T (f = 6.55332 mm) |
|---|---|---|---|
| F | 2.0586725 | 2.0546725 | 2.0604225 |
| G | 0.3483275 | 0.3523275 | 0.3465775 |

Figure 2:
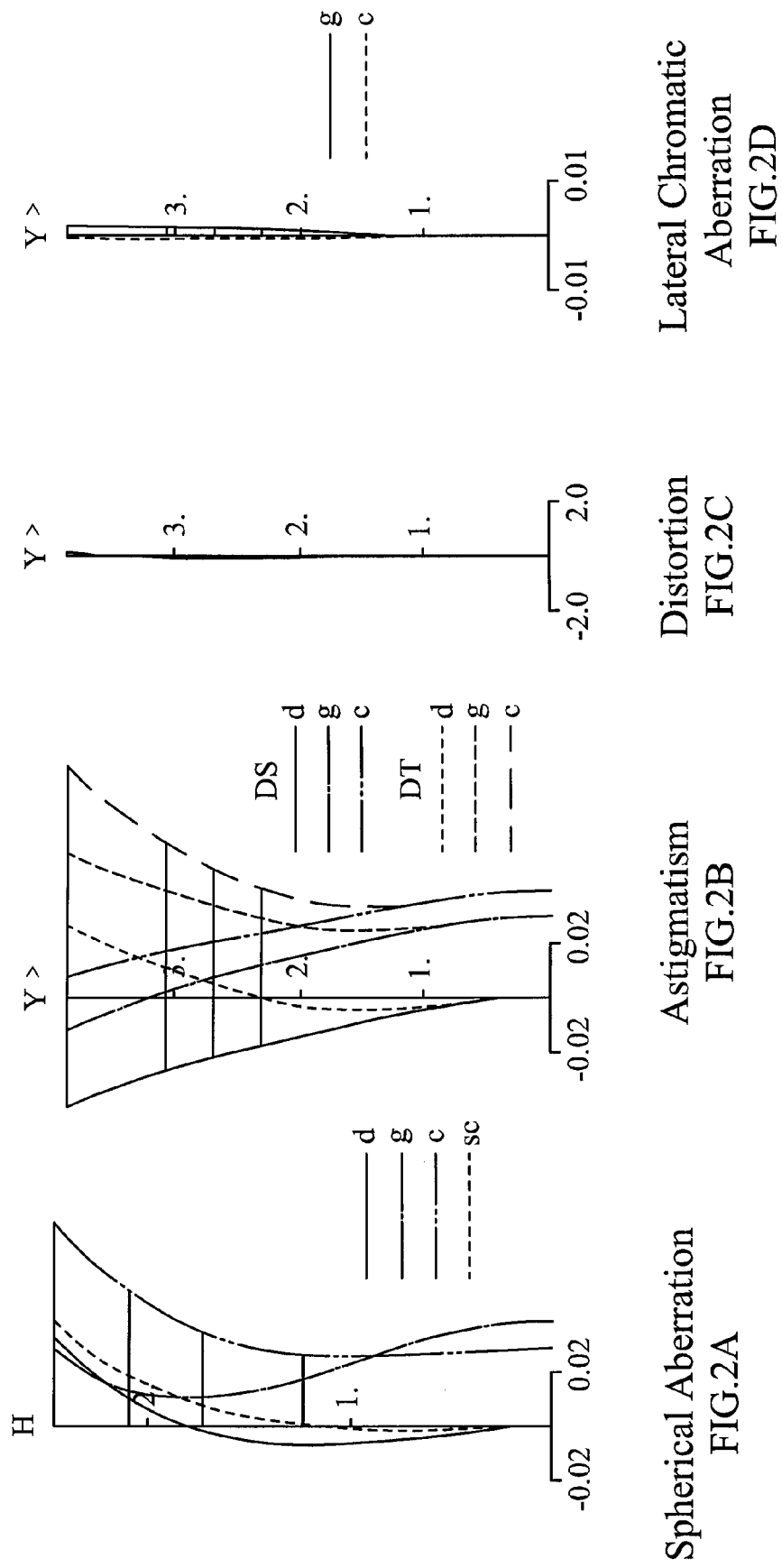
FIG. 2A is a graphic representation of spherical aberration according to the zoom lens of the present invention at the telephoto end state.
FIG. 2B is a graphic representation of astigmatism aberration according to the zoom lens of the present invention at the telephoto end state.
FIG. 2C is a graphic representation of distortion aberration according to the zoom lens of the present invention at the telephoto end state.
FIG. 2D is a graphic representation of lateral chromatic aberration according to the zoom lens of the present invention at the telephoto end state.

FIGS. 2A to 2D are illustrations showing various aberration diagrams at the telephoto end state of the present invention. As shown in FIG. 2A, the spherical aberration of the present zoom lens at the telephoto end state is less than 0.1 mm. As shown in FIG. 2B, the astigmatism of the present zoom lens at the telephoto end state is less than 0.1 mm. As shown in FIG. 2C, the distortion of the present zoom lens at the telephoto end state is less than 0.3%. As shown in FIG. 2D, the lateral chromatic aberration of the present zoom lens at the telephoto end state is less than 0.03 mm.

Figure 4:
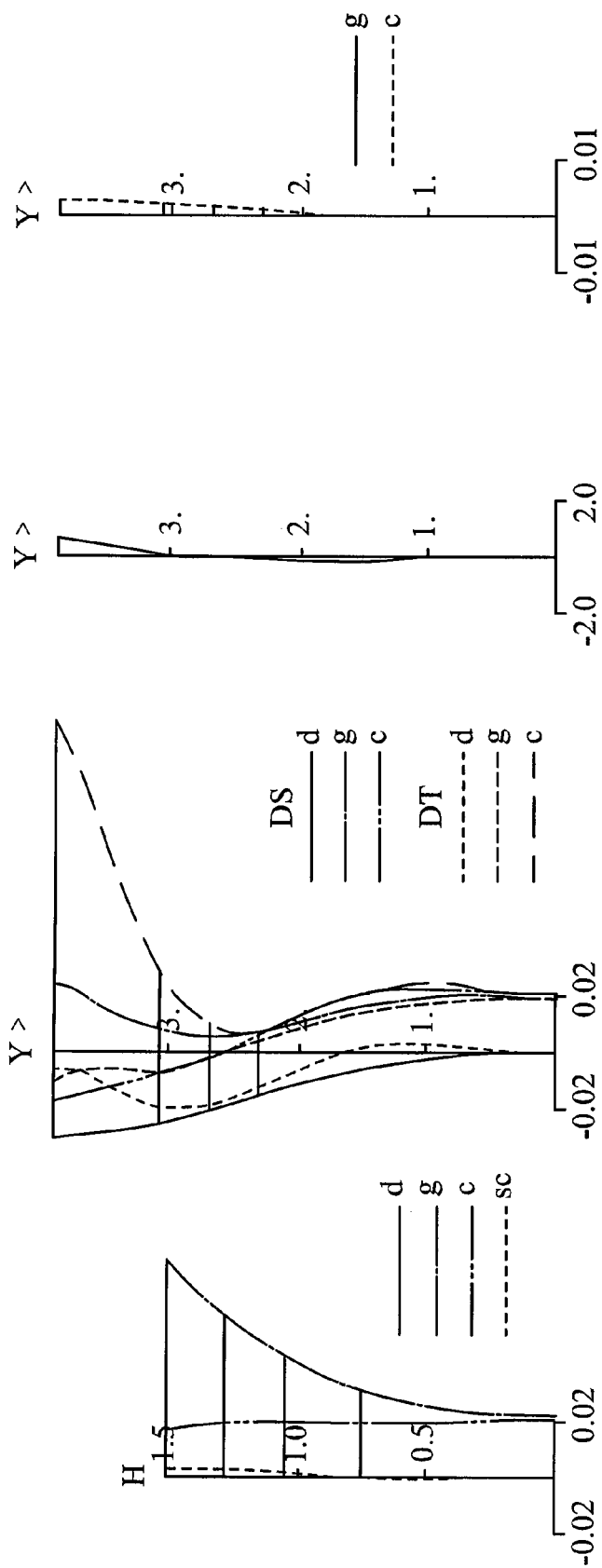
FIG. 4A is a graphic representation of spherical aberration according to the zoom lens of the present invention at the intermediate position.
FIG. 4B is a graphic representation of astigmatism aberration according to the zoom lens of the present invention at the intermediate position.
FIG. 4C is a graphic representation of distortion aberration according to the zoom lens of the present invention at the intermediate position.
FIG. 4D is a graphic representation of lateral chromatic aberration according to the zoom lens of the present invention at the intermediate position.

FIGS. 4A to 4D are illustrations showing various aberration diagrams at the intermediate position of the present invention. As shown in FIG. 4A, the spherical aberration of the present zoom lens at the intermediate position is less than 0.1 mm. As shown in FIG. 4B, the astigmatism of the present zoom lens at the intermediate position is less than 0.12 mm. As shown in FIG. 4C, the distortion of the present zoom lens at the intermediate position is less than 0.6%. As shown in FIG. 4D, the lateral chromatic aberration of the present zoom lens at the intermediate position is less than 0.04 mm.

Figure 6:
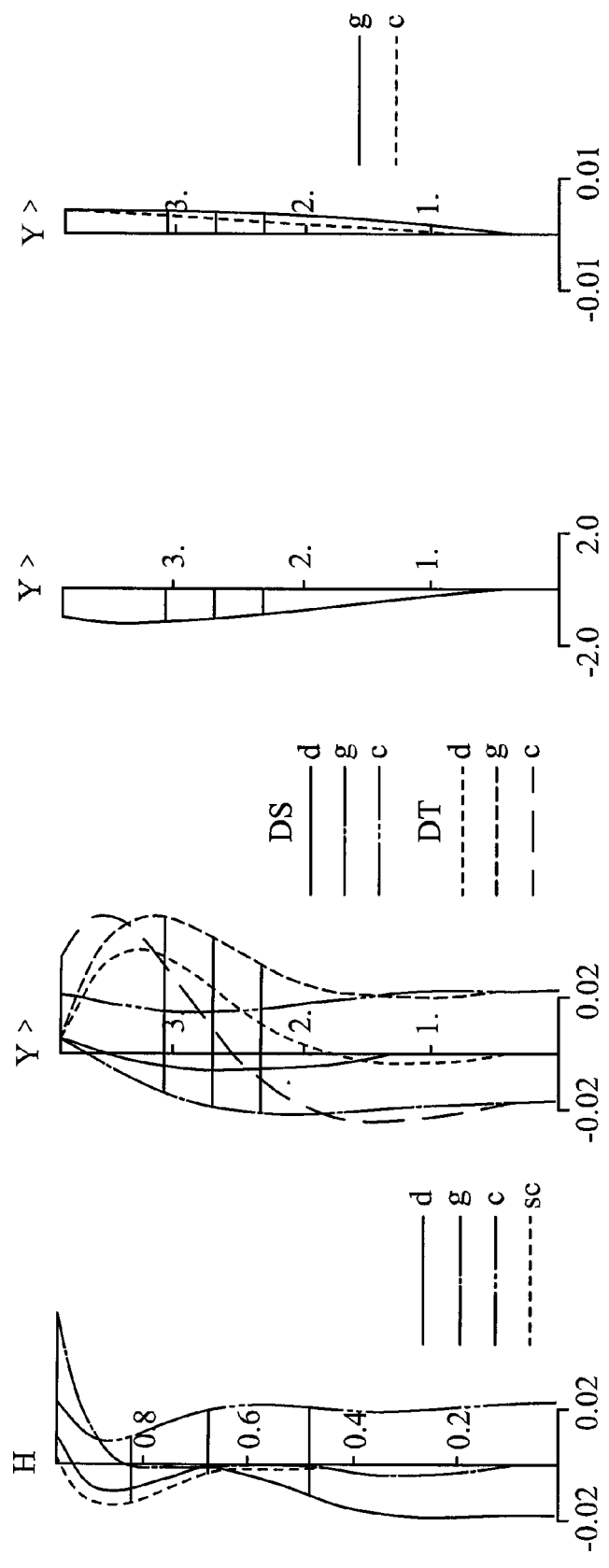
FIG. 6A is a graphic representation of spherical aberration according to the zoom lens of the present invention at the wide-angle end state.
FIG. 6B is a graphic representation of astigmatism aberration according to the zoom lens of the present invention at the wide-angle end state.
FIG. 6C is a graphic representation of distortion aberration according to the zoom lens of the present invention at the wide-angle end state.
FIG. 6D is a graphic representation of lateral chromatic aberration according to the zoom lens of the present invention at the wide-angle end state.

FIGS. 6A to 6D are illustrations showing various aberration diagrams at the wide-angle end state of the present invention. As shown in FIG. 6A, the spherical aberration of the present zoom lens at the telephoto end state is less than 0.08 mm. As shown in FIG. 6B, the astigmatism of the present zoom lens at the wide-angle end state is less than 0.08 mm. As shown in FIG. 6C, the distortion of the present zoom lens at the wide-angle end state is less than 1%. As shown in FIG. 6D, the lateral chromatic aberration of the present zoom lens at the wide-angle end state is less than 0.06 mm.

As described above, the present zoom lens satisfies the following condition.

$$0.7 \times \Delta X2 = \Delta X5 \quad (1)$$

where $\Delta X2$ represents the displacement of the second lens group 20 moving along the optical axis OA and $\Delta X5$ represents the displacement of the fifth lens group 50 moving along the optical axis OA.

From Data Table 3 as provided above, it can be obtained that, for zooming from the wide-angle end state to the intermediate position, the displacement $\Delta X2$ of the second lens group 20 moving along the optical axis OA with respect to the first lens group 10 is 1.0485 mm; and the displacement $\Delta X5$ of the fifth lens group 50 moving along the optical axis OA with respect to the sixth lens group 60 is 0.73375 mm. It can also be obtained that, for zooming from the intermediate position to the telephoto end state, the displacement $\Delta X2$ of the second lens group 20 moving along the optical axis OA with respect to the first lens group 10 is 0.7285 mm; and the displacement $\Delta X5$ of the fifth lens group 50 moving along the optical axis OA with respect to the sixth lens group 60 is 0.51025 mm. It is apparent that all these values for the embodiment satisfy the above condition (1).

As described above, the present zoom lens satisfies the following condition.

$$2.17 < \frac{TTL}{f} < 8.7 \quad (2)$$

where TTL represents a distance along the optical axis OA from an object-side surface OBJ of the first lens L1 of first lens group 10 to an image forming surface and f represents the focal length of the present zoom lens.

According to the present invention, the focal length f of the zoom lens at the wide-angle end state is 1.737 mm, the focal length f of the zoom lens at the intermediate position is 3.37662 mm, and the focal length f of the zoom lens at the telephoto end state is 6.55332 mm. In addition, the distance TTL along the optical axis OA from an object-side surface OBJ of the first lens L1 of first lens group 10 to an image forming surface is 14.6775 mm, and the f-number of the zoom lens varying from a wide-angle end state to a telephoto end state is between 3.5 and 5.15. Thus, it is apparent that all these values for the embodiment satisfy the above condition (2).

The present zoom lens has a plurality of movable lens groups, but the displacement of each movable lens group is tiny. Thus, the present zoom lens provides the advantages of small size and low cost as compared to the conventional designs, while ensuring a high level of image performance. Further, from FIGS. 2A-2D, 4A-4D and 6A-6D that illustrate various aberrations generated by the present zoom lens according to the different zooming variation, it can be seen that various aberrations have been well corrected by the combination of aspheric lenses and spherical lenses of the present invention. Therefore, a high level of image performance has been obtained by the present zoom lens while providing a compact configuration.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A zoom lens, in order from an object side to an image side along an optical axis, comprising:
    a first lens group having positive refractive power;
    a second lens group having negative refractive power;
    a third lens group having positive refractive power;
    a fourth lens group having positive refractive power;
    a fifth lens group having positive refractive power; and
    a sixth lens group having positive refractive power;
    wherein, during zooming of the zoom lens from a wide-angle end state to a telephoto end state for changing a focal length thereof, the positions of the first and sixth lens groups are fixed, and the second lens group, fourth lens group and fifth lens group are moved toward the third lens group along the optical axis.

2. The zoom lens as claimed in claim 1, wherein the first lens group further includes an optical-path bending member.

3. The zoom lens as claimed in claim 1, wherein the zoom lens satisfies the following condition:

$$0.7 \times \Delta X2 = \Delta X5$$

where $\Delta X2$ represents the displacement of the second lens group moving along the optical axis and $\Delta X5$ represents the displacement of the fifth lens group moving along the optical axis.

4. The zoom lens as claimed in claim 2, wherein the first lens group further comprises, in order from the object side to the image side, a negative lens and a positive lens, and the optical-path bending member is located between the negative lens and the positive lens.

5. The zoom lens as claimed in claim 4, wherein the negative lens has two aspheric surfaces.

6. The zoom lens as claimed in claim 5, wherein the negative lens is a negative meniscus lens whose convex surface is oriented toward the object side.

7. The zoom lens as claimed in claim 1, wherein the zoom lens satisfies the following condition:

$$2.17 \leq \frac{TTL}{f} < 8.7$$

where TTL represents a distance along the optical axis from an object-side surface of the first lens of first lens group to an image forming surface and f represents the focal length of the zoom lens.

8. The zoom lens as claimed in claim 1, further comprising an aperture stop located between the third lens group and the fourth lens group.

9. The zoom lens as claimed in claim 8, wherein the positions of the third lens group and the aperture stop are fixed.

10. The zoom lens as claimed in claim 9, wherein the third lens group is a positive meniscus lens whose convex surface is oriented toward the object side.

11. The zoom lens as claimed in claim 10, wherein the positive meniscus lens has two aspheric surfaces.

12. The zoom lens as claimed in claim 1, wherein the fourth lens group further comprises, in order from the object side to the image side, a positive lens and a negative lens, and the positive and negative lenses are combined to form a cemented lens.

13. The zoom lens as claimed in claim 12, wherein the object side surface of the positive lens which does not adhere to the negative lens is aspheric.

14. The zoom lens as claimed in claim 12, wherein the negative lens is a negative meniscus lens whose convex surface is oriented toward the image side.

15. The zoom lens as claimed in claim 1, wherein the second lens group further comprises, in order from the object side to the image side, two negative lenses and one positive lens.

16. The zoom lens as claimed in claim 15, wherein the positive and negative lenses are combined to form a cemented lens.

17. The zoom lens as claimed in claim 1, wherein the sixth lens group has a positive lens adjacent to the image side and the positive lens is finely moved along the optical axis to compensate the focus of the zoom lens.

* * * * *